US006731568B1

(12) United States Patent
Audebert et al.

(10) Patent No.: US 6,731,568 B1
(45) Date of Patent: May 4, 2004

(54) SEISMIC PROSPECTING METHOD USING CONVERTED WAVE PROCESSING

(75) Inventors: François Audebert, Paris (FR);
Pierre-Yves Granger, rue de l'Effort Mutuel (FR)

(73) Assignee: Compagnie Gererale de Geophysique, Massy (FR)

( * ) Notice: Subject to any disclaimer, the term of this patent is extended or adjusted under 35 U.S.C. 154(b) by 0 days.

(21) Appl. No.: 10/111,837
(22) PCT Filed: Oct. 26, 2000
(86) PCT No.: PCT/FR00/02984
§ 371 (c)(1),
(2), (4) Date: Aug. 14, 2002
(87) PCT Pub. No.: WO01/31364
PCT Pub. Date: May 3, 2001

(30) Foreign Application Priority Data

Oct. 28, 1999 (FR) .............................. 99 13538

(51) Int. Cl.⁷ .............................. G01V 1/28; G01V 1/36
(52) U.S. Cl. .............................. 367/75; 367/46; 367/73; 702/18
(58) Field of Search .............................. 367/46, 62, 73, 367/75; 702/14

(56) References Cited

U.S. PATENT DOCUMENTS

| 4,597,066 A | * | 6/1986 | Frasier | .......................... 367/30 |
| 4,839,869 A | * | 6/1989 | Corcoran | ..................... 367/53 |
| 4,881,209 A | | 11/1989 | Bloomquist et al. | |
| 5,610,875 A | * | 3/1997 | Gaiser | .......................... 367/25 |
| 5,835,452 A | | 11/1998 | Mueller et al. | |
| 6,128,580 A | * | 10/2000 | Thomsen | ..................... 702/18 |

FOREIGN PATENT DOCUMENTS

WO     WO 99 54758 A     10/1999

OTHER PUBLICATIONS

Gaiser, J.E.; "Multicomponent V/subp//V/sub s/ correlation analysis", Geophysics, Jul.–Aug. 1996, Soc. Exploration Geophysicists, USA, vol. 61, No. 4, pp. 1137–1149.

* cited by examiner

Primary Examiner—Nelson Moskowitz
(74) Attorney, Agent, or Firm—Duane Morris LLP

(57) ABSTRACT

A seismic prospection method in which a compression seismic wave is emitted into the subsoil and sensors are used to collect seismic data having at least a shear component, and in which the data corresponding to said shear component is processed to deduce information about the geology of the subsoil, the method being characterized in that an estimate of the ratio:

$$\int_{Z_0}^{Z} v_p \cdot dl \bigg/ \int_{Z_0}^{Z} v_s \cdot dl$$

is determined where $v_p$ and $v_s$ are values for real local compression and shear speeds, where $l$ is the depth coordinate in the subsoil, where $Z$ is the value of this depth coordinate at the bottom surface of the last layer to be analyzed, and the seismic data is inverted in order to deduce the local values of compression and shear speed for said layer to be analyzed, by using a model in which this estimate is used for the invariant parameter $\gamma_{eff}$.

12 Claims, 3 Drawing Sheets

SEISMIC PROSPECTING METHOD USING CONVERTED WAVE PROCESSING

The present invention relates to a seismic prospection method in which the converted waves are processed.

The general principle of seismic prospection consists in using a seismic source to create a disturbance in the subsoil and in using sensors to record seismic data generated by the disturbance so as to extract information therefrom about the geology of the subsoil, and in particular to detect the presence of hydrocarbons.

Figure 1:
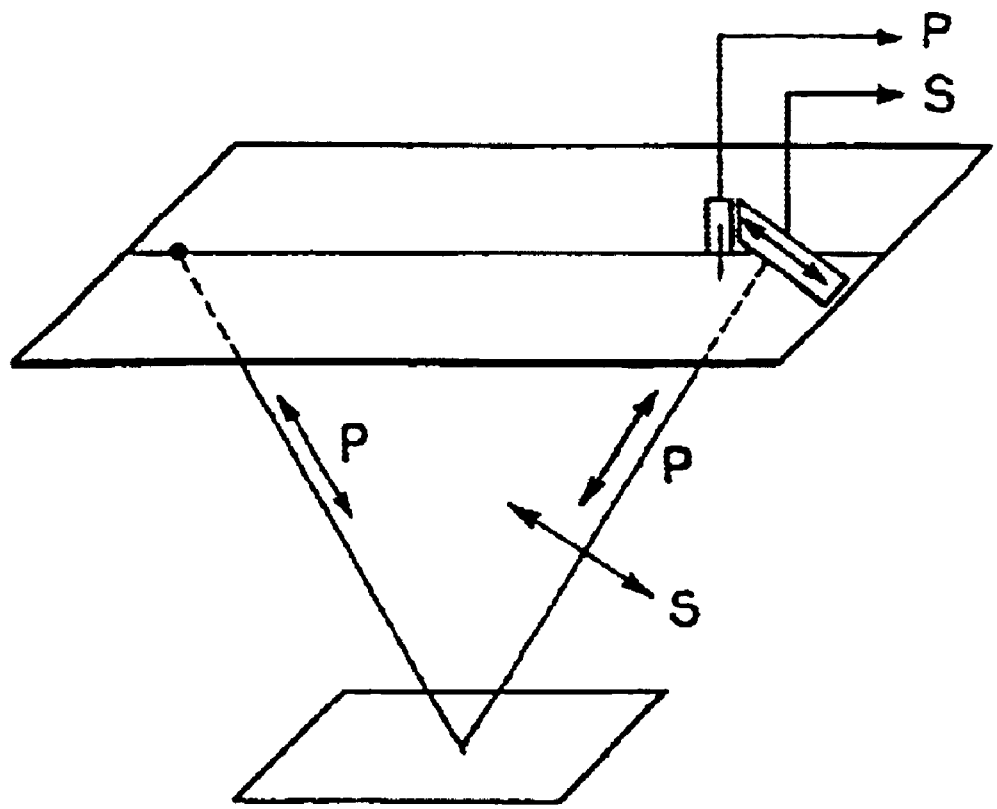

FIG. 1 shows a sound wave propagating in the subsoil from a source 1. The sound wave in the example shown is a compression wave which is reflected in the subsoil to give rise to components comprising a compression reflected wave and a shear reflected wave.

Compression waves (so-called P-waves) vibrate in their direction of propagation, while shear waves (so-called S-waves) vibrate perpendicularly to their direction of propagation. The propagation speed of shear waves is slower than the propagation speed of compression waves, and knowledge of the speed fields of compression waves and of shear waves can be used to determine information about the subsoil. For example, the ratio between the speeds of the compression waves and of the shear waves can be used to determine the pressure coefficient of the rocks they have traveled through and can also be used as an indicator of hydrocarbon presence.

Conventionally, in order to invert seismic data, speed field models are used which depend on various parameters that are assumed to be invariant over a given range of source-receiver offsets and in a given three-dimensional acquisition zone, however these parameters can vary "slowly" in three dimensions, i.e. they can differ from one zone in three dimensions to another.

To invert seismic data corresponding to SS or PP reflections in the subsoil, parameters $V_p$ and $V_s$ are used which represent the apparent speeds of the compression waves and of the shear waves after dynamic correction ("normal move out" or "NMO"), and also parameters $T_p$ and $T_s$ which represent respectively the vertical travel times of the P-waves and of the S-waves. The parameters $T_p$ and $V_p$ suffice for PP speed analysis, while the parameters $T_s$ and $V_s$ suffice for SS speed analysis.

Converted speeds (PS reflections) are generally analyzed by using models in the time domain which make use of the parameters $V_p$ and $V_s$, and also of a parameter $V_c$ where $V_c$ is such that:

$$T_c \cdot V_c^2 = T_p \cdot V_p^2 + T_s \cdot V_s^2 \text{ where } T_c = T_s + T_p$$

The models making use of those three parameters are effective with materials that are homogeneous and isotropic for S-waves and P-waves. However, in media that are vertically inhomogeneous or that are highly anisotropic, it has been shown that account needs to be taken of two other parameters, referred to in the literature as $\gamma_{\text{eff}}$ and $\gamma_0$, where $\gamma_{\text{eff}} = \gamma_n^2 / \gamma_0$ with $\gamma_n = V_p / V_s$ and $\gamma_0 = T_s / T_p$.

The offset X between the reflection point and a source depends to the first order on the parameter $\gamma_{\text{eff}}$ and to the second order on the parameter $\gamma_0$, and also on the quantity $T_c \cdot V_c^2$.

In this respect, reference can advantageously be made to the following publication:

[1] L. Thomsen, 1998, "Converted-wave reflection seismology over anisotropic, inhomogeneous media", 68th Annual Meeting, SEG Expanded Abstracts, pp. 2048–2051.

Nevertheless, in that publication, the parameter $\gamma_{\text{eff}}$ is assumed to be known. Unfortunately, in practice and as a general rule, none of the above-mentioned parameters is known immediately.

An object of the invention is to provide a seismic processing method applicable to converted waves which is particularly reliable and independent of any prior knowledge of the parameters $\gamma_{\text{eff}}$ and $\gamma_0$.

Proposals have recently been made to determine the lateral offset of the conversation point by using the lateral correlation between forward source-receiver offset images and backward source-receiver offset images, i.e. images obtained by inverting the positions of the sources and of the receivers.

In this respect, reference can be made to:

[2] P. Hermann, G. Michaud, P. Y. Granger, 1999, "Stacking mode-converted waves", presented at the CSEG Conference, Calgary, May 1999.

The invention provides a seismic prospection method in which a compression seismic wave is emitted into the subsoil and sensors are used to collect seismic data having at least a shear component, and in which the data corresponding to said shear component is processed to deduce information about the geology of the subsoil, the method being characterized in that an estimate of the ratio:

$$\int_{Z_0}^{Z} v_p \cdot dl \bigg/ \int_{Z_0}^{Z} v_s \cdot dl$$

is determined where $v_p$ and $v_s$ are values for real local compression and shear speeds, where l is the depth coordinate in the subsoil, where Z is the value of this depth coordinate at the bottom surface of the last layer to be analyzed and where $Z_0$ is the value of this depth coordinate at the top surface of said layer or of a layer above it, and the seismic data is inverted in order to deduce the local values of compression and shear speed for said layer to be analyzed, by using a model in which this estimate is used for the invariant parameter $\gamma_{\text{eff}}$.

The invention advantageously further includes the following characteristics taken singly or in any technically feasible combination:

the parameter $\gamma_{\text{eff}}$ is determined for various different possible values thereof by applying migration processing to the seismic data that corresponds to the shear component, and by determining the value for the parameter $\gamma_{\text{eff}}$ at which the forward and backward seismic images are best correlated;

to vary the parameter $\gamma_{\text{eff}}$, the following notation is used:

$$v_{p\alpha} = \alpha v_{p0} \text{ and } v_{s\beta} = \beta v_{s0}$$

where $v_{p0}$ and $v_{s0}$ are previously determined approximate values for $v_p$ and $v_s$, and both of the variables α and β are varied;

the model uses as invariant parameters at least four of the following parameters: $\gamma_0$, $\gamma_{\text{eff}}$, $T_p$, $F_p$, $T_c$, and $F_c$ where $\gamma_0 = T_s / T_p$, $\gamma_{\text{eff}} = F_p / F_s$, $T_c = T_p + T_s$, and where $T_p$ and $T_s$ represent the vertical travel times for the compression and shear waves respectively, where $F_p$ is such that $(F_p / T_p)^{1/2}$ represents a compression speed, and where $F_c$ is such that $((F_c - F_p)/T_s)^{1/2}$ represents a shear speed;

when the variables $\alpha$ and $\beta$ are varied, the parameters $\gamma_0$, $\gamma_{eff}$, $T_p$, $F_p$, and $F_c$ are replaced as follows:

$$\gamma_0' = \alpha/\beta * \gamma_0$$

$$\gamma_{eff}' = \alpha/\beta * \gamma_{eff}$$

$$T_p' = T_p * (1+\gamma_0)/(1+\gamma_0')$$

$$F_p' = F_p * \alpha^2 * (1+\gamma_0)/(1+\gamma_0')$$

$$F_c' = F_c * \alpha\beta * (1+\gamma_0)/(1+\gamma_0') * (1+\gamma_{eff}')/(1+\gamma_{eff})$$

and migration is applied to the seismic data corresponding to these new parameters;

to vary the parameter $\gamma_{eff}$, $\beta$ is set equal to $1/\alpha$, and $\alpha$ is varied;

after the parameter $\gamma_{eff}$ has been determined, $v_p$ and $v_s$ are varied while keeping $\gamma_{eff}$ constant, and the parameter $F_c$ is determined for which the alignment in the offset axis is at a maximum;

to vary $v_p$ and $v_s$, the following notation is used:

$$v_{p\alpha} = \alpha v_{p0} \text{ and } v_{s\alpha} = \alpha v_{s1}$$

where $v_{p1}$ and $v_{s1}$ are values determined for $v_p$ and $v_s$ in step 2, and the variable $\alpha$ is varied;

after determining the parameter $F_c$, the parameter $T_p$ and/or the parameter $\gamma_0 = T_s/T_p$ is/are determined;

the parameter $T_p$ is advantageously determined from the $v_p$ speed field determined by analyzing the compression component of the seismic data;

processing is subsequently performed to bring the S-speed and the P-speed models to a common depth; and after processing to achieve a common depth, large-offset curvature processing is implemented by varying the anisotropy parameters $\delta$ and $\sigma$ while keeping the following ratio constant:

$$(1+2\delta)/(1+2\sigma)$$

Figure 2:
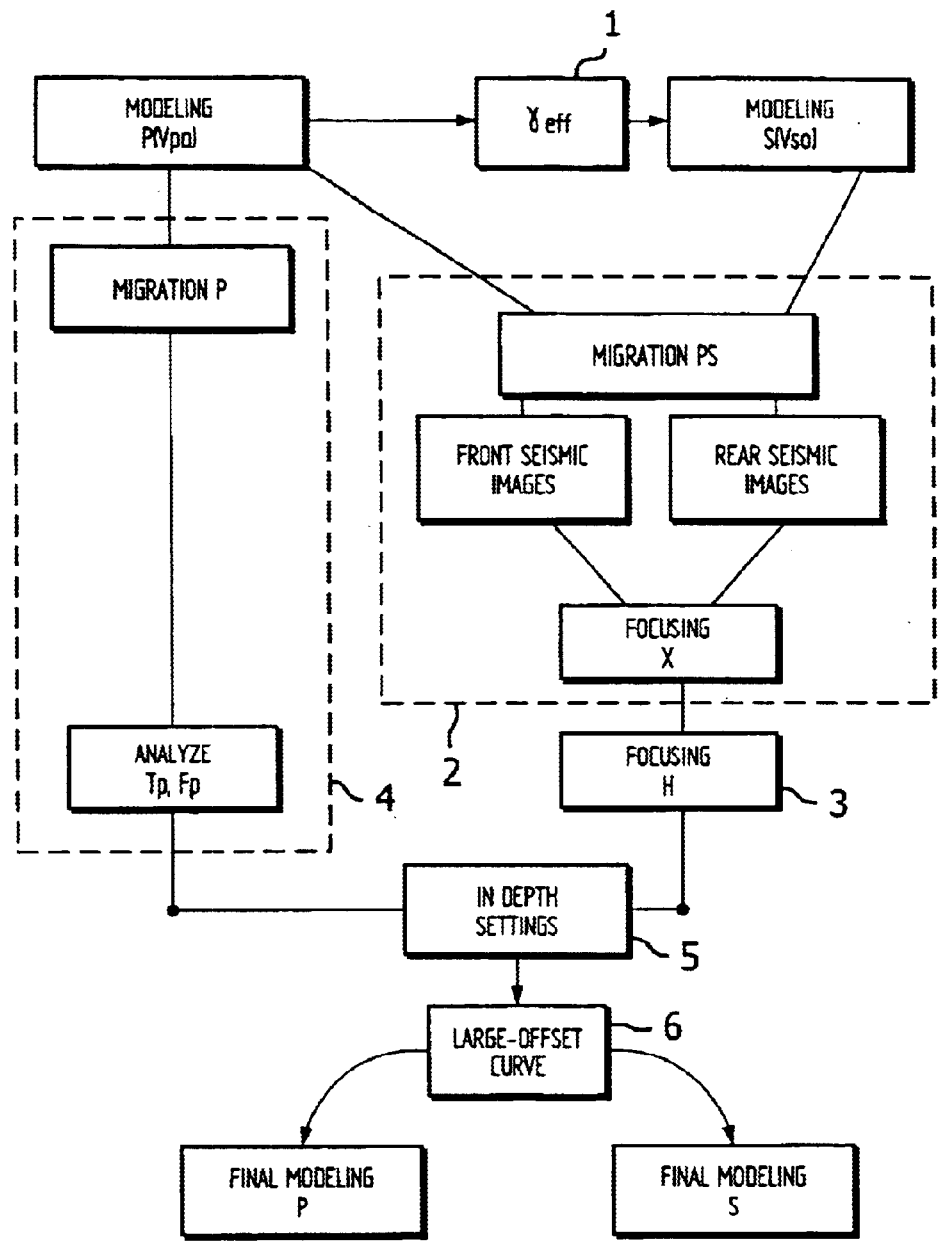
Figure 3A:
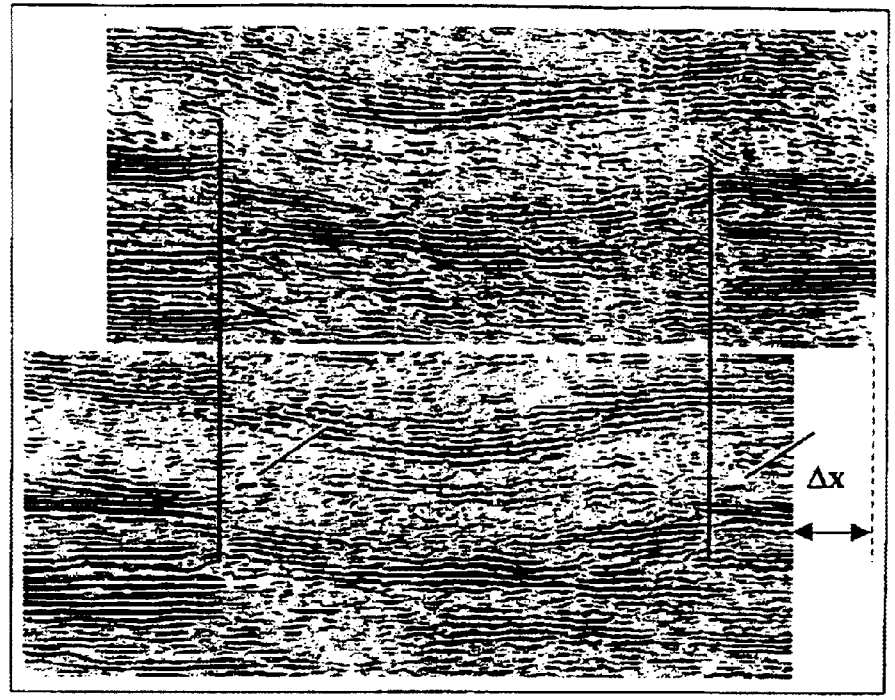
Figure 3B:
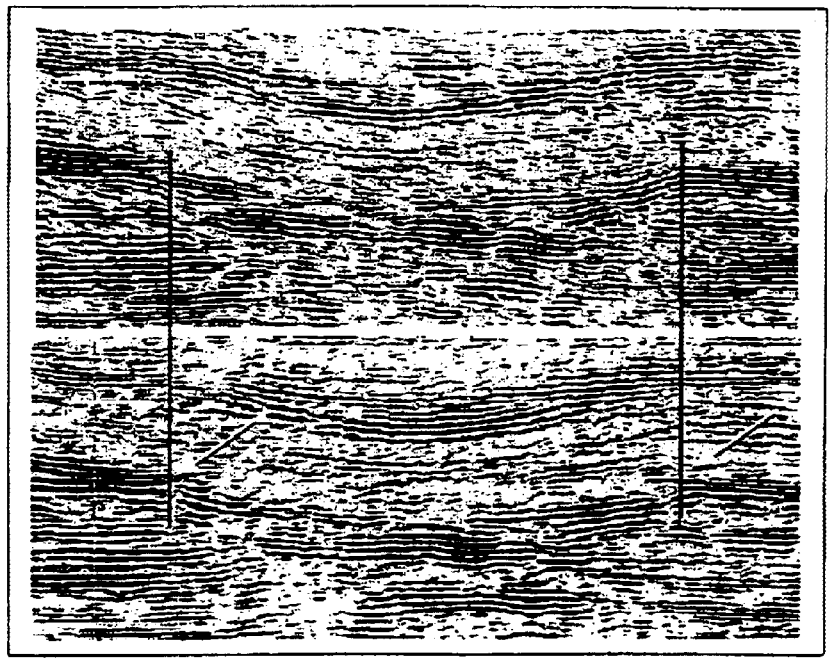

Other characteristics and advantages of the invention appear further from the following description. This description is purely illustrative and non-limiting. It should be read with reference to the accompanying figures, in which:

FIG. 1, discussed above, is a diagram showing how a compression wave emitted by a sound source takes on S-wave and P-wave components;

FIG. 2 shows various processing steps in one possible implementation of the invention; and FIGS. 3a and 3b show the influence of the positioning of the common conversion points on determining $\gamma_{eff}$.

The processing described below with reference to FIG. 2 et seq. is performed on seismic images constituted by seismic traces, some corresponding to PS-waves and others to PP-waves, the traces being acquired by means of a dense 2D or 3D array of seismic sources and of geophone or hydrophone sensors distributed in at least one acquisition axis.

This processing comprises various steps referenced 1 to 6.

In a first step (step 1), approximate values are determined for the parameters for modeling speeds in the analysis layer, usually the first layer in the subsoil whose speeds are to be inverted, with the speeds of the layers above this analysis layer having already been inverted, e.g. by performing the same processing.

Specifically, an estimate is determined for the parameter $\gamma_{eff}$.

To this end and by way of example, use is made of time seismic images corresponding to the initial PP acquisition in order to determine an initialization value for the invariant parameter $V_p$, and time seismic images corresponding to the initial PS acquisition are used for determining an initialization value for the invariant parameter $V_s$.

In a second step (step 2), processing is implemented to determine a more precise value for $\gamma_{eff}$.

To this end, a value of $\gamma_{eff}$ is determined for which the offset $\Delta X$ is zero along one acquisition axis between the forward and backward PS seismic images, which images are obtained by inverting the positions of the sources and of the sensors along the acquisition axis in question.

More precisely, the forward seismic images are obtained by considering a dense set of emitters in an alignment on the azimuth which corresponds to the acquisition axis and by taking the resulting seismic traces for sensors that are offset from the emitters along the acquisition axis by a constant, predefined (algebraic) offset. The backward images are obtained by using emitters directly adjacent to the sensors used for acquiring the forward seismic images, together with sensors offset relative to these emitters along the acquisition axis by an (algebraic) offset that is the inverse of that used for acquiring the forward images.

Which are emitters and sensors that should be selected is extracted from the data during migration.

The forward and backward images as determined in this way are then used to determine the correct value of $\gamma_{eff}$.

It has been shown that the offset $X_c$ of the conversion point relative to the source along the acquisition axis depends on $\gamma_{eff}$ to the first order, and on the parameter $\gamma_0$ and the quantity $T_c \cdot V_c^2$ to the second order.

Unfortunately, the determination of this quantity $T_c \cdot V_c^2$ suffers from spread of the conversion point which depends on the error concerning $\gamma_{eff}$ however this spread always occurs in the opposite sense when a given emitter/receiver pair is inverted.

The lateral coherence, i.e. the offset $\Delta X$ between the forward image and the backward image is thus zero when the value of $\gamma_{eff}$ is correct.

Thus, the condition $\Delta X = 0$ is equivalent to an exact determination of $\gamma_{eff}$ or to an exact determination of the offset $X_c$ of the conversion point (so-called determination of the common conversion point (CCP) configuration).

This is shown in FIGS. 3a and 3b. FIG. 3a shows, one below the other, the forward and the backward migrated seismic images obtained for some value of $\gamma_{eff}$. The forward image corresponds to the backward image only with an offset $\Delta X$. FIG. 3b shows, one below the other, the forward and the backward seismic images obtained after the value of $\gamma_{eff}$ has been determined, i.e. after common conversion point configuration. There is then no offset between the forward and backward images.

The method thus implements processing making it possible to determine the value of $\gamma_{eff}$ at which the offset $\Delta X$ is zero.

This determination of the value of $\gamma_{eff}$ for which the offset $\Delta X$ is zero can be done, for example, by writing:

$$v_{p\alpha} = \alpha v_{p0} \text{ and } v_{s\beta} = \beta v_{s0}$$

where $v_{p0}$ and $v_{s0}$ are approximate values for the real local compression and shear speeds determined by means of migrations implemented on the initial PP and PS acquisitions, and where $\alpha$ and $\beta$ are variables.

By way of example, it is possible to use global values for $v_{p0}$ and $v_{s0}$ corresponding to an estimate of a mean speed through all of the layers, including the layer being analyzed. Instead of using the conventional invariants $V_p$, $V_s$, $T_p$, $T_s$, $V_c$, $\gamma_{eff}$, and $\gamma_0$, it can be shown that it is possible to use the invariants $T_p$, $F_p$, $T_s$, $F_s$, or indeed $T_p$, $F_p$, $T_c$, $F_c$, where $F_p$, $F_s$, and $F_c$ satisfy:

$$F_p = T_p \cdot V^2$$

$$F_s = T_s \cdot V_s^2$$

$$F_c = T_c \cdot V_c^2$$

These invariants are mathematically equivalent to the conventional invariants $V_p$, $V_s$, $T_p$, $T_s$, $V_c$, $\gamma_{eff}$, and $\gamma_0$. They have the advantage of being easy to calculate from a field of values $v_p$, $v_s$, since the following apply:

$$T_p = \int_{Z_0}^{Z} dl/v_p$$

$$F_p = \int_{Z_0}^{Z} v_p \cdot dl$$

$$T_s = \int_{Z_0}^{Z} dl/v_s$$

$$F_s = \int_{Z_0}^{Z} v_s \cdot dl$$

and $$\gamma_{eff} = F_p/F_s$$

where $v_p$ and $v_s$ are the real local values of the compression and shear speeds, where l designates the depth coordinate in the subsoil, where Z is the value of said depth coordinate at the bottom surface of the last layer to be analyzed, and where $Z_0$ is the value of said depth coordinate at the top surface of said layer or of a layer above it.

Furthermore: $T_p$, $F_p$, $T_s$, $F_s$ are the four fundamental independent parameters from which all the others can be derived.

$$\gamma_{eff} = F_p/F_s$$

$$\gamma_0 = T_s/T_p$$

$$F_c = F_p + F_s$$

$$T_c = T_p + T_s$$

$$V_p = \sqrt{(F_p/T_p)}$$

$$V_s = \sqrt{(F_s/T_s)}$$

$$V_c = \sqrt{(F_c/T_c)} \text{ etc.}$$

As a result the following combinations in fours are sufficient for the problem to be completely determined.

$(T_p, F_p, T_s, F_s)$ $(T_p, F_p, T_c, F_c)$ (these are the most useful), or indeed:

$(T_p, V_p, T_s, V_s)$ $(T_p, V_p, T_c, V_c)$ etc.

For each pair ($\alpha$, $\beta$) the parameters $\gamma_0$, $\gamma_{eff}$, $T_p$, $F_p$, and $F_c$ are replaced as follows:

$$\gamma_0' = \alpha/\beta \cdot \gamma_0$$

$$\gamma_{eff}' = \alpha/\beta \cdot \gamma_{eff}$$

$$T_p' = T_p \cdot (1+\gamma_0)/(1+\gamma_0')$$

$$F_p' = F_p \cdot \alpha^2 \cdot (1+\gamma_0)/(1+\gamma_0')$$

$$F_c' = F_c \cdot \alpha\beta \cdot (1+\gamma_0)/(1+\gamma_0') \cdot (1+\gamma_{eff}')/(1+\gamma_{eff})$$

and PS migration corresponding to these new parameters is applied to the seismic data.

After subjecting the seismic data to migration, the correlation between the forward and backward seismic images is calculated.

The pair ($\alpha$, $\beta$) for which this correlation is the greatest is selected.

This processing is advantageously implemented using $\beta = 1/\alpha$ since that means it is necessary to vary only the variable $\alpha$ (as opposed to factoring $v_s$ and $v_p$).

Once $\gamma_{eff}$ has been determined in this way, processing is performed in a new step (step 3—focusing H, where the letter H conventionally represents the source-receiver offset) in order to refine the value of the parameter $F_c$.

Specifically, $v_p$ and $v_s$ are varied while keeping $\gamma_{eff}$ constant.

For example, the following are used: $v_{p\alpha} = \alpha v_{p1}$ and $v_{s\alpha} = \alpha v_{s1}$, where $v_{p1}$ and $v_{s1}$ are the values determined for $v_p$ and $v_s$ in step 2, and where $\alpha$ is a variable that is varied (co-factoring $V_p$ and $V_s$)

The new parameters $\gamma_0'$, $\gamma_{eff}'$, $T_p'$, $F_p'$, and $F_c'$ are determined corresponding to these speeds $v_{p\alpha}$ and $v_{s\alpha}$ (by replacing $\beta$ by $\alpha$ in the formulation given above for these parameters), and migration processing is applied using a model which corresponds to these parameters. This time, the migration produces (candidate) common conversion point collections. Instead of looking at an image for a forward offset and an image for a backward offset over an entire image line, a set of discrete positions in space is looked at in alignment along the offset axis in question (common conversion point or CCP positions).

The value used for $F_c$ is that which corresponds to the value of $\alpha$ for the best alignment along the offset axis. Analysis is performed on as many CCP positions as described.

Once $\gamma_{eff}$ and $F_c$ have been determined in this way at the end of this third step, the same applies to $F_s$ and $F_p$.

Nevertheless, $T_p$ and $\gamma_0$ which depend on each other still need to be determined.

$\gamma_0$ controls the condition for bringing the PP images to a common depth (but is not sufficient for so doing except on the unlikely assumption of the P-waves and the S-waves being perfectly isotropic). Conversely, an independent measurement of $\gamma_0$, constrained by the condition that PP and PS need to be at the same depth, gives access to the anisotropy of the medium.

$T_p$ is advantageously determined in a step 4 from the $v_p$ speed field as determined by analyzing the PP-waves. It will be observed that it is not essential to determine $T_p$ in order to determine the parameters $F_p$ and $F_s$ which have been determined coherently by the processing applied in step 2 to the PS-waves.

Thus, at the end of this step 4, all of the parameters of the PS and PP model are known: $T_p$, $F_p$, $T_s$, and $F_s$.

In a step 5, processing is applied to obtain a common depth for the S and P speed models. The parameters $T_p$, $F_p$, $T_s$, and $F_s$ as determined in the preceding steps made use of the last layer and made no prior judgment as to the existence of any anisotropy. Nevertheless, determining these invariant parameters at a depth common to the P and S models requires anisotropy to be taken into account (the T and F invariants make use of different local speeds when anisotropy is present).

For this purpose, processing is used that relies on a vertical transverse isotropy (VTI) model of the type proposed by Thomsen in:

[3] Thomsen, 1986, "Weak elastic anisotropy", Geophysics, 51, 1954–1966, and by making use in particular of the anisotropy parameters δ and σ introduced by Thomsen in that publication.

(It is recalled that these aniostropy parameters satisfy in particular:

$$V_{nmop}=V_{p0}\sqrt{1+2\delta} \text{ and } V_{nmos}=V_{s0}\sqrt{1+2\sigma}$$

where $V_{nmop}$ and $V_{nmos}$ are the apparent compression and shear speeds and where $V_{p0}$ and $V_{s0}$ are the vertical speeds.)

The true depth $Z_r$ is common to the true P and S speed models, and is associated with $F_p$ and $T_p$ in the first model and with $F_s$ and $T_s$ in the second, by the two mutually independent anisotropy parameters δ and σ.

In terms of apparent mean value, these parameters δ and σ are constrained by the following relationship:

$$\gamma_{eff}/\gamma_0=(1+2\delta)/(1+2\sigma)$$

Furthermore, since the invariant parameters $T_p$, $F_p$, $T_s$, and $F_s$ are integrals over depth, they naturally lend themselves to layer stripping, which problem reduces to locally determining the invariants at the roof of the last layer.

Five local unknowns ($v_p$, $v_s$, Z, δ, σ) are then determined, i.e. the speeds corresponding to P-mode propagation and to S-mode propagation, the common depth at the bottom of the layer, and the two anisotropy parameters, by using four measurements, $T_p$, $T_s$, $F_p$, and $F_s$. Full determination requires either information with a large offset, or else borehole information in order to constrain Z or δ.

For example, δ can be set equal to 0.

Focusing and fitting the PP and PS images then amounts to solving the following system of equations so as to find solutions for Z, $v_p$, $v_s$, and σ.

$$T_p = \int_{Z_0}^{Z} dl/v_p$$

$$F_p = \int_{Z_0}^{Z} v_p \cdot \sqrt{1+2\delta} \cdot dl$$

$$T_s = \int_{Z_0}^{Z} dl/v_s$$

$$F_s = \int_{Z_0}^{Z} v_s \cdot \sqrt{1+2\sigma} \cdot dl$$

In a last step (step 6) curvature treatment is applied at a large offset. Solving analysis of P-wave and S-wave speeds in an anisotropic medium by isotropic approximations over short offsets has left the problem with only one degree of freedom: behavior at large offset where the anisotropy shows up the most clearly. The behavior of the large-offset travel times is probed by migration before addition by varying the anisotropy parameters while keeping the following ratio constant:

$$(1+2\delta)/(1+2\sigma).$$

What is claimed is:

1. A seismic prospecting method in which a compression seismic wave is emitted into the subsoil and sensors are used to collect seismic data having at least a shear component, and in which the data corresponding to said shear component is processed to deduce information about the geology of the subsoil, the method being characterized in that an estimate of the ratio:

$$\int_{Z_0}^{Z} v_p \cdot dl \bigg/ \int_{Z_0}^{Z} v_s \cdot dl$$

is determined where $v_p$ and $v_s$ are values for real local compression and shear speeds, where l is the depth coordinate in the subsoil, where Z is the value of this depth coordinate at the bottom surface of the last layer to be analyzed and where $Z_0$ is the value of this depth coordinate at the top surface of said layer or of a layer above it, and the seismic data is inverted in order to deduce the local values of compression and shear speed for said layer to be analyzed, by using a model in which this estimate is used for the invariant parameter $\gamma_{eff}$.

2. A method according to claim 1, characterized in that the parameter $\gamma_{eff}$ is determined for various different possible values thereof by applying migration processing to the seismic data that corresponds to the shear component I and by determining the value for the parameter $\gamma_{eff}$ at which the forward and backward seismic images are best correlated.

3. A method according to claim 2, characterized in that to vary the parameter $\gamma_{eff}$, the following notation is used:

$$v_{p\alpha}=\alpha v_{p0} \text{ and } v_{s\beta}=\beta v_{s0}$$

where $v_{p0}$ and $v_{s0}$ are previously determined approximate values for $v_p$ and $v_s$, and both of the variables α and β are varied.

4. A method according to anyone of claims 1 to 3, characterized in that the model uses as invariant parameters at least four of the following parameters: $\gamma_0$, $\gamma_{eff}$, $T_p$, $F_p$, $T_c$, and $F_c$ where $\gamma_0=T_s/T_p$, $\gamma_{eff}=F_p/F_s$, $T_c=T_p+T_s$, and where $T_p$ and $T_s$ represent the vertical travel times for the compression and shear waves respectively, where $F_p$ is such that $(F_p/T_p)^{1/2}$ represents a compression speed, and where $F_c$ is such that $((F_c-F_p)/T_s)^{1/2}$ represents a shear speed.

5. A method according to claims 3 and 4 taken in combination, characterized in that when the variables a and p are varied, the parameters $\gamma_0$, $\gamma_{eff}$, $T_p$, $F_p$, $T_c$, and $F_c$, are replaced as follows:

$$\gamma_0'=\alpha/\beta*\gamma_0$$

$$\gamma_{eff}'=\alpha/\beta*\gamma_{eff}$$

$$T_p'=T_p*(1+\gamma_0)/(1+\gamma_0')$$

$$F_p'=F_p*\alpha^2*(1+\gamma_0)/(1+\gamma_0')$$

$$Fe'=Fe*\alpha\beta*(1+\gamma_0)/(1+\gamma_0')*(1+\gamma_{eff}')/(1+\gamma_{eff})$$

and migration is applied to the seismic data corresponding to these new parameters.

6. A method according to claim 5, characterized in that to vary the parameter $\gamma_{eff}$, β is set equal to 1/α, and α is varied.

7. A method according to any preceding claim, characterized in that after the parameter $\gamma_{eff}$ has been determined, $v_p$ and $v_s$ are varied while keeping $\gamma_{eff}$ constant, and the parameter $F_c$ is determined for which the alignment in the offset axis is at a maximum.

8. A method according to claim 7, characterized in that to vary $v_p$ and $v_s$, the following notation is used:

$$v_{p\alpha}=\alpha v_{p1} \text{ and } v_{s\alpha}=\alpha v_{s1}$$

where $v_{p1}$ and $v_{s1}$ are values determined for $v_p$ and $v_s$ in claim 2, and the variable α is varied.

9. A method according to claim 7 or 8, characterized in that after determining the parameter $F_c$, the parameter $T_p$ and/or the parameter $\gamma_0 = T_s/T_p$ is/are determined.

10. A method according to claim 9, characterized in that the parameter $T_p$ is advantageously determined from the $v_p$ speed field determined by analyzing the compression component of the seismic data.

11. A method according to claim 9 or 10, characterized in that processing is subsequently performed to bring the S-speed and P-speed models to a common depth.

12. A method according to claim 11, characterized in that after processing to achieve a common depth, large-offset curvature processing is implemented by varying the anisotropy parameters $\delta$ and $\sigma$ while keeping the following ratio constant:

$$(1+2\delta)/(1+2\sigma).$$

* * * * *